ELECTRICAL IDENTIFICATION CIRCUIT

Filed Feb. 8, 1961 2 Sheets-Sheet 1

INVENTORS
LEONARD LAMIN
MORRIS RIBNER

BY [signature]
ATTORNEY 3,060,271
Patented Oct. 23, 1962

3,060,271

ELECTRICAL IDENTIFICATION CIRCUIT

Leonard Lamin, Oak Park, and Morris Ribner, Chicago, Ill., assignors to International Telephone and Telegraph Corporation, New York, N.Y., a corporation of Maryland Filed Feb. 8, 1961, Ser. No. 87,789
11 Claims. (Cl. 179—18)

This invention relates to electrical identification circuits and more particularly to means for identifying crosspoints in a switching matrix and circuits connected thereto.

Normally, automatic switching equipment extends connections from a first point to a second point. Since the connections are completed toward the second point, it is usually enough if the identity of only the second point is known so that it may be sought out by the switching equipment. However, it may occasionally be desirable to identify the first point so that additional functions can be provided. For example, in telephone systems, it is necessary to identify a calling line when a charge is made for a toll call, when a crime is being investigated, or when annoying calls are being traced. Sometimes, a faulty teletypewriter automatically connects itself to a maintenance position and it is necessary to identify the teletypewriter so that the fault can be found and corrected. Still other occasions, when circuit identification is desirable, will readily occur to those skilled in the art.

In the past, identifiers have tended to be large, expensive apparatus. Therefore, their use could be economically justified only in connection with large, expensive, switching equipment. Usually, smaller switching equipment has relied upon either manual identification or a verifying operation.

Accordingly, an object of this invention is to provide new and improved identifying circuits and more particularly to provide means for identifying particular switching points among a large group of switching points and, therefore, the circuits connected thereto.

Another object of this invention is to identify calling circuits according to their position in a switching matrix.

A more specific object of this invention is to provide economical, low cost means for identifying operated switching points in relatively small switching systems. In this connection it is an object to use standardized, low cost, readily available components as distinguished from specially designed, high cost components.

In accordance with one aspect of this invention, the switching points in an electrical matrix include not only the principal switching devices that are necessary to interconnect calling and called circuits, but also a supplemental switching device that provides for circuit identification. The principal and supplemental switching devices operate in unison when a switching point closes or opens. A source of cyclically recurring pulse trains, each indicating an individually corresponding numerical value, is connected to one side of each supplemental switching device for selectively transmitting a particular pulse train to an identifying circuit connected to the other side of the supplemental switching devices. Therefore, as each switching point closes, the source of cyclically recurring pulses transmits a series of pulse trains to the identifying circuit which then gives an indication of the operated switching point and, hence, the equipment attached to the operated switching point.

The above mentioned and other objects and features of this invention and the manner of obtaining them will become more apparent and the invention itself will be best understood by making reference to the following description of an embodiment of the invention taken in conjunction with the attached drawing in which:

FIG. 2 shows the individual logic symbols used in FIG. 1;

To facilitate an understanding of the invention, it is described hereinafter in connection with a crossbar switch (enclosed within a dot-dashed box in FIG. 1) of the type used in automatic telephony. However, the invention has general application to any crosspoint switching device; therefore, the term "crosspoint" switch is used herein as a generic term. Also, for convenience of expression, the circuits to be identified are hereinafter referred to as "calling circuits." Again, it should be understood that the invention may be used any time that it is necessary to identify a particular electrical circuit among a large group of electrical circuits. Thus, the terms used and items described herein are not to be construed as limiting the invention to specific devices, but are to be construed as encompassing the full range of equivalents allowed under established principles of patent law.

The components in the identifying circuit are shown by the logic symbols set forth in FIG. 2. More specifically, a flip-flip is shown as a rectangle having a bisecting line. If the input terminal (marked by an arrowhead) is energized, the flip-flip turns "on" to energize the output conductor, thus remembering the energizing signal. If the reset terminal (marked by a heavily inked dot) is energized the flip-flip turns "off" to deenergize the output terminal, thus forgetting the energizing signal and remembering the resetting signal.

An "AND" gate is shown by a semi-circle including an ampersand. The simultaneous energization of all input conductors causes a current flow through the output terminal.

An "OR" gate is shown by a semi-circle having input conductors intersecting its chord. Energization of any input conductor causes a corresponding current flow through the output terminal.

Figure 1:
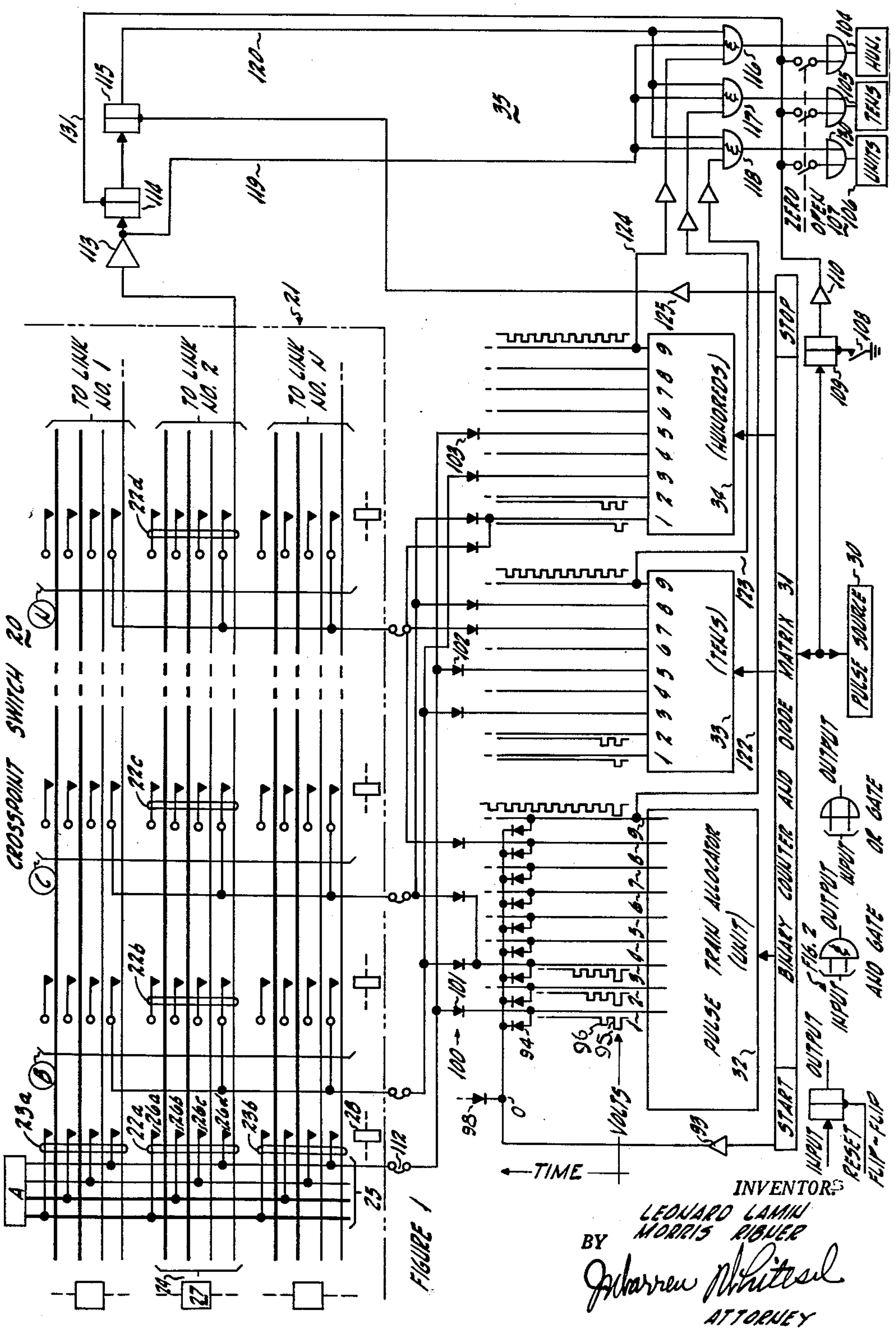
FIG. 1 is a logic circuit diagram showing the principles of the invention used in connection with a crosspoint switching matrix which, in this exemplary construction, is a telephone type crossbar switch.

FIG. 1 of the attached drawings shows the crosspoint switch 20 above and at the left of a dot-dashed line 21, and the identification circuit, per se, beneath and at the right of the dot-dashed line 21. The crosspoint switch includes a plurality of switching points some of which are identified by the reference numerals 22, 23 (with letters suffixed). As will be apparent from an inspection of the drawing, each switching point is located at the intersection of horizontal and vertical multiples. In the case of switching point 22*a*, for example, a first or horizontal, 4-wire multiple 24 intersects with a second or vertical, 4-wire multiple 25. The heavily inked wires in each multiple may be the well known telephone tip and ring conductors and the lightly inked wires may be an associated pair of sleeve or control conductors.

Referring to the specific switching point 22*a* by way of example, a number of principal switching devices or contacts 26*a*—26*c* are provided to complete the principal switching circuit function of interconnecting an electrical circuit and a link. A supplemental switching device or contact 26*d* is also provided at the switching point 22*a* to complete the identification circuit. The principal contacts 26a—26c and the supplemental contacts 26d operate in unison.

The circuits to be identified, shown at A, B, C, and N, are coupled to one side of each principal switching device and the links #1, #2, and #N which cooperate with the coupled circuits to perform an electrical function are connected to the other side of the principal switching devices. The identifying circuit, per se, which is shown beneath and to the right of the dot-dashed line 21, connects through the supplemental switching devices 26d. Thus, the identification is completed via a fourth conductor which is sometimes referred to in the art of automatic telephony as an "auxiliary private conductor," an "extra control conductor," or a "helping sleeve conductor."

In one exemplary system, the electric circuit to be identified attached to the vertical multiple at A is a teletypewriter and the link #2 attached to the horizontal multiple is a maintenance position. The object in this particular sysem is to identify the teletypewriter that needs service. Other equipment is attached to other vertical multiples at B, C, . . . N, and other links #1 and #N are attached to other horizontal multiples. All of this equipment is interconnected through the crosspoint switch to provide a complete communication center giving telephone, teletype, intercommunication, and other services. Although the drawing shows an exemplary crosspoint switch having four vertical multiples and three horizontal multiples that provide a total of twelve switching points, the exemplary system has 400 vertical multiples and 20 horizontal multiples to provide 8,000 electronically controlled, relay-operated switching points.

Briefly, the exemplary crosspoint switch shown in the drawing operates in the following manner. A first magnet 27 selectively operates to prepare all of the switching points 22a—22d associated with link #2. Thereafter, a second magnet 28 operates to select the switching point 22a, thus completing the connection between circuit A and link #2. Then, the magnet 27 releases and the switching point 22a is held operated by the magnet 28. By inspection of the drawing, it is apparent that any of the other circuits B, C . . . N may thereafter be connected with any of the other links #1 . . . #N by the selective operation of magnets similar to 27, 28. Therefore, the problem is to identify the particular one of the switching points which is closed and in many cases the circuit coupled thereto.

Figure 3:
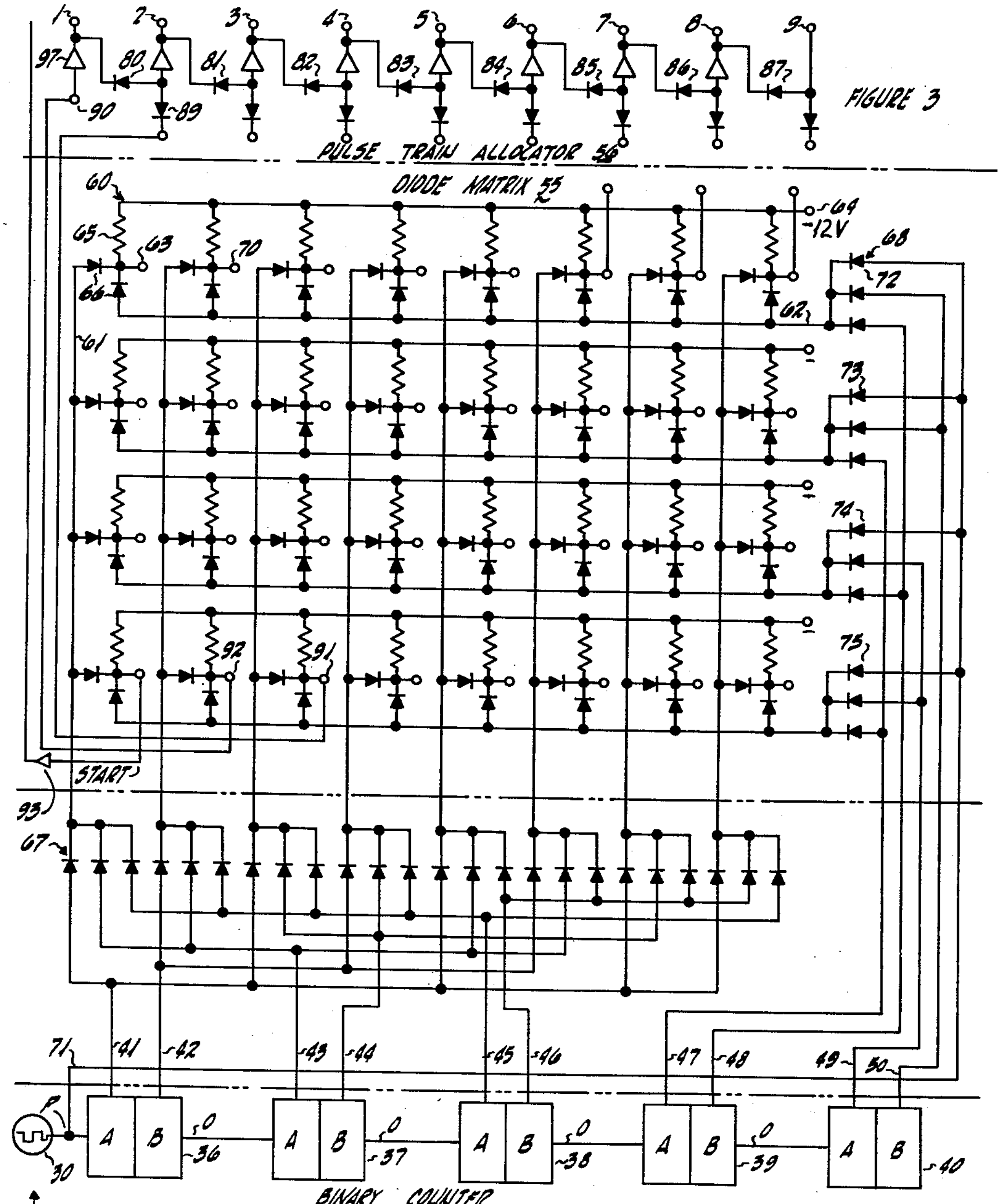
FIG. 3 is a circuit drawing showing the binary counter, diode matrix, and pulse train allocator used in the circuit of FIG. 1 to direct pulse trains to supplemental switching points.

The principal components of the identifying circuit are a pulse source 30, a binary counter and diode matrix 31, hundreds, tens, and units pulse train allocators 32—34 and logic circuitry 35. Reference is made to FIG. 3 for a showing of the details of the circuits 30—34.

Figure 4:
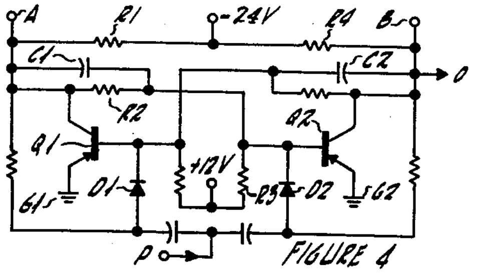
FIG. 4 is a flip-flop circuit which provides the function shown by a logic symbol in FIG. 3.

The pulse source 30 is any suitable generator of cyclically recurring preferably square wave pulses, such as a free-running multivibrator, for example. Other pulse sources, such as the standard, 60 cycle per second commercial power may also be used. The output of the pulse source is applied to a binary counter or a chain of bistable circuits 36—40 (FIG. 3). A single bistable circuit such as any one of these is shown in FIG. 4 as including a pair of output terminals A, B, and a pair of transistors Q1, Q2, which may be PNP junction type devices. Each transistor has its emitter (indicated by an arrowhead showing the direction of positive current flow) connected to ground. The base bias for each transistor is established by a voltage divider connected between a (+)12 volt battery and a (−)24 volt battery. For example, the base bias for transistor Q2 is established by the voltage divider including resistors R1, R2, and R3, and more particularly by the potential at the junction between resistors R2, R3. If transistor Q1 is turned "on," its emitter ground G1 appears at the junction between resistors R1, R2 in lieu of the (−)24 volt battery. This ground holds the output terminal A at ground potential and causes the base of transistor Q2 to be positive relative to its emitter. A PNP device such as transistor Q2 turns "off" when so biased. With transistor Q2 turned "off" the (−)24 volt battery connected to resistor R4 appears at terminal B.

Figure 5:
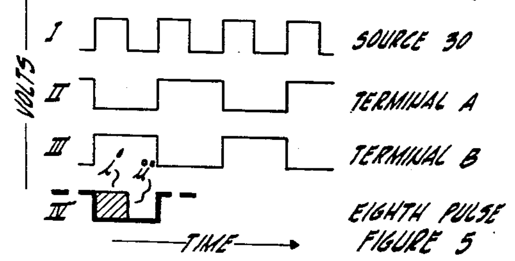
FIG. 5 is plot of voltage changes (along the $y$ axis) with respect to time (along the $x$ axis) occurring in the circuit of FIG. 3.

The input terminal P of the flip-flop circuit of FIG. 4 is driven in positive and negative directions by the pulse source 30 having an output waveform shown by curve I of FIG. 5. When this waveform makes terminal P positive, a positive potential is applied through diodes D1, D2 to the base electrodes of transistors Q1, Q2. Since transistor Q2 is assumed to be "off" and further since a positively biased base (relative to an emitter) turns "off" a PNP junction type device, there is no immediate effect at transistor Q2. On the other hand, the positive potential appearing at the base electrode of transistor Q1 turns it "off." Thus, the emitter ground G1 is removed from the junction between resistors R1, R2. The output terminal A and the base electrode of transistor Q2 go to the negative potential applied by the (−)24 volt battery through the resistor R1. The transistor Q2 switches "on" to apply its emitter ground G2 to output terminal "B" and to remove the base drive current from transistor Q1 to hold it "off." The capacitors C1, C2 speed the transition periods while transistors Q1, Q2 switch "off" and "on" respectively.

The next positive going pulse appearing at input terminal P switches transistor Q2 "off" and transistor Q1 "on." Therefore, as each succeeding pulse in the output source 30 appears at terminal P, the output terminals A, B are energized as shown by curves II, III, respectively, of FIG. 5.

The output terminal B of a stage in the binary counter is connected at 0 to the input terminal P of the next stage. Therefore, during the half cycles when the potential at output terminal B is going positive, a pulse is transmitted to the next stage. In this manner, a number of flip-flop stages such as that shown in FIG. 4 may be cascaded to provide the binary counter as shown at 36—40 (FIG. 3).

With the foregoing description of the flip-flop circuit in mind and upon inspection of FIG. 3, it will be apparent that the bistable circuits 36—40 drive each other "off" and "on" at intervals timed by the output of the pulse source 30. More specifically, the A, B output conductors 41—50 are energized in the following manner [assuming that a grounded conductor equals (+) and a negatively energized conductor equals (−)]:

*Table 1*

| No. of pulses from source 30 | Energized states of conductors 41-50 | | | | | | | | | |
|---|---|---|---|---|---|---|---|---|---|---|
| | 41 | 42 | 43 | 44 | 45 | 46 | 47 | 48 | 49 | 50 |
| 1 | + | − | + | − | + | − | + | − | + | − |
| 2 | − | + | + | − | + | − | + | − | + | − |
| 3 | + | − | − | + | + | − | + | − | + | − |
| 4 | − | + | − | + | + | − | + | − | + | − |
| 5 | + | − | + | − | − | + | + | − | + | − |
| 6 | − | + | + | − | − | + | + | − | + | − |
| 7 | + | − | − | + | − | + | + | − | + | − |
| 8 | − | + | − | + | − | + | + | − | + | − |
| 9 | + | − | + | − | + | − | − | + | + | − |
| 10 | − | + | + | − | + | − | − | + | + | − |
| 11 | + | − | − | + | + | − | − | + | + | − |
| 12 | − | + | − | + | + | − | − | + | + | − |
| 13 | + | − | + | − | − | + | − | + | + | − |
| 14 | − | + | + | − | − | + | − | + | + | − |
| 15 | + | − | − | + | − | + | − | + | + | − |
| 16 | − | + | − | + | − | + | − | + | + | − |
| 17 | + | − | + | − | + | − | + | − | − | + |
| 18 | − | + | + | − | + | − | + | − | − | + |
| 19 | + | − | − | + | + | − | + | − | − | + |
| 20 etc. | − | + | − | + | + | − | + | − | − | + |

Thus, each pulse from source 30 is identified by a particular combination or binary code of energized A, B output conductors among the group 41—50. The binary cycle repeats after thirty-two positive going pulses from source 30 have been counted.

Means are provided for translating these binary coded pulses into decimally related pulses. More particularly, this translating means is here shown as a combination of the binary counter 36—40 and a diode matrix 55. The diode matrix includes a plurality of intersecting vertical and horizontal buses selectively energized by way of a number of isolating diodes connected to the A, B output conductors 41—50.

To explain the operation and construction of this matrix, reference is made specifically to the point 60 where the vertical bus 61 and horizontal bus 62 intersect, it being understood that all other of the thirty-two intersecting points are constructed and operate in a similar manner.

At point 60, the output terminal 63 is made negative by the output of a (—) 12 volt battery 64 applied through resistor 65 unless a positive voltage or ground potential is also applied to terminal 63 through the diodes 66 via either or both of the intersecting buses 61, 62.

To control the application of the positive voltage to the point 60, first and second groups of diodes 67, 68 are interposed between the point 60 and the output conductors 41—50 of the binary counter 36—40. These diodes are poled to conduct when the connected output conductor is of positive polarity or ground potential and not to conduct when it is of negative polarity. Thus, by inspection of FIG. 3, it is apparent that the positive or ground potential appears at the matrix output terminal 63 unless each of the output conductors 41, 43, 45, 48, and 50 is negative, and further that the output of the (—)12 volt battery 64 appears at terminal 63 when these conductors are negative and diodes 66 are back biased. Therefore, from Table 1 we learn that output terminal 63, and only output terminal 63, is pulsed negatively on the eighth pulse in the binary count cycle. By making similar comparisons between Table 1 and matrix 55, it is apparent that every output terminal in the matrix is pulsed once, and only once, during every thirty-two pulses from source 30.

Those familiar with diode matrix circuitry will recognize the foregoing as a description of the usual minimum diode matrix. However, for present purposes, the output pulses produced by such a matrix, per se, are inadequate because the make-break ratio between adjacent pulses is inadequate to trip conventional counters. For example, from the above Table 1 it is apparent that during the seventh pulse output terminal 70 is pulsed negatively and during the eighth pulse output terminal 63 is pulsed negatively. From the description of FIG. 4 it is apparent that the interval between these negative pulses is the transition time required to switch the negative potential from output terminal B to terminal A. Since this transition time is very short, most counters see—not two pulses—but one pulse of double length. In like manner, if such a counter is connected to be driven from three, four, five, etc. diode matrix output terminals, it sees a single pulse having a threefold, fourfold, fivefold, etc. length.

In carrying out this invention, the space between the digital pulses produced by the diode matrix 55 results from a connection 71 between the pulse source 30 and each output point in the diode matrix 55. This connection is completed to the horizontal bus 62 through diode 72 and to other horizontal buses through diodes 73—75. Thus, the matrix is inhibited and no negative output pulse can be delivered from the matrix during any time interval when the voltage from source 30 has a positive polarity or ground potential. For example, during the eighth pulse in the binary count cycle, a negative pulse would ordinarily appear in a minimum diode matrix at output terminal 63, as shown by the heavily inked waveform IV (FIG. 5). However, with the diode 72 connected between output terminal 63 and source 30, a positive or ground potential appears at terminal 63 during the half cycle when the output of source 30 is positive or grounded, the circuit being traced from source 30 over conductor 71, through diode 72, bus 62, and the lower diode 66

(as viewed in FIG. 3) to output terminal 63. Thus, the cross hatched area (*i*) of waveform IV is chopped from what would otherwise be the negative output pulse. In his manner the cross hatched area (*i*) is the space between digit pulses and the area (*ii*) is the pulse itself.

An advantage of this arrangement is that the space between the digit pulses is produced by a minimum number of extremely inexpensive diodes at the source of the digital pulses. Thus, there is no need for transistorized, or other flip-flop circuits which automatically turn "on" and "off" to provide the spaces, nor is there any need for a great number of circuits at individual counters or registers. Moreover, the time ratio between the make and break periods (*i*), (*ii*) may be adjusted by choice of circuit values in the pulse source to accommodate the requirements of inexpensive commercially available counters and registers.

Means are provided for generating cyclically recurring pulse trains from the decimally related pulses emanating from the diode matrix 55. In the exemplary system shown in FIG. 1, these pulse trains are produced by the allocators 32—34 and the pulse trains are graphically shown by the voltage curves adjacent output conductors 1–9. As indicated adjacent output conductor 1 of units allocator 32, each curve is a plot of voltage change with respect to time (voltage being plotted along the horizontal axis and time being plotted along the vertical axis).

Each pulse train allocator includes the circuitry 56 shown at the top of FIG. 3 and in block 32. To orient the reader, the digits 1–9 adjacent the small circles at the top of FIG. 3 indicate the conductors marked 1–9 above block 32, FIG. 1, there being similar circuits for blocks 33, 34. The pulse train allocator circuit includes a series of diodes 80—87 individually connected between the output conductors 1–9. At each junction (except the first) between the series connected diodes, an isolating diode (such as 89) prevents feedback between various output terminals in the diode matrix 55 and pulse train allocator 56. The first diode may be omitted at point 90 because there can be no feedback into the matrix, as will become more apparent. Each of these isolating diodes and point 90 is individually connected to an output terminal in the diode matrix. For example, the isolating diode 89 and point 90 are connected to the output matrix terminals 91, 92 respectively; therefore, output conductor 1 is pulsed during the binary count when a negative potential appears at output terminal 92, and the output conductor 2 is pulsed when a negative potential appears at the output terminal 91.

The pulse allocator circuit operates this way. The first pulse received from source 30 is applied through the diode matrix 55 to an amplifier 93. The output voltage from amplifier 93 is applied simultaneouly to each of the output conductors 1–9 of the units circuit 32 via an OR gate of isolating diodes, one of which is shown at 94 (FIG. 1) to produce a relatively large voltage pulse 95 (such as —24 volts) on each units output conductor to mark the start of a count cycle.

The second pulse received from source 30 is applied through the diode matrix 55 to point 90 and through each of the diodes 80–87 (FIG. 3) to pulse simultaneously all of the units output conductor 1–9, and the zero output conductor 98. Since no amplifier corresponding to the amplifier 93 is connected between the output terminals of the diode matrix 55 and output conductors 1–9, this second pulse 96 (and all succeeding pulses) are relatively small voltage pulses (such as —12 volts) for example. The amplifiers, one of which is marked 97, provided in the pulse train allocator ensure a uniform voltage for each of these small voltage pulses. For example, if there is a half-volt drop through each of the diodes 80–87, the pulses applied to output conductor 9 would be as much as four-and-one-half volts less than the pulse applied to output conductor 1. Hence, the output of these amplifiers may be selected to give all of the small voltage pulses 96 a uniform amplitude. The diode 89 and similar diodes in the pulse train allocator prevent the negative pulse transmitted through point 90 from feeding back into the matrix. There is no need for a similar isolating diode at point 90 because diode 80 prevents negative pulses from feeding back to the matrix via that point.

The third pulse received from pulse source 30 is applied through diode 89 to the output conductor 2 and through diodes 81–87 to the output conductors 3–9. The diode 80, however, prevents energization of the output conductor 1 responsive to this third pulse.

In a similar manner, each of the other output conductors of all pulse train allocators is pulsed by a number of relatively small voltage pulses which indicate the numerical position of the output conductor. But, only the units output conductors are pulsed by the relatively large voltage start pulse 95. If the count cycle should start with the hundreds count, for example, the large voltage start pulse would appear on each of the output conductors of the hundreds pulse train allocator 34, but not on those of the units allocator 32.

In carrying out this invention, each of the crosspoint switching points, such as **22*a* (FIG. 1), is identified by cross wiring connections extended from the output conductors of the units, tens, and hundreds pulse train allocators 32—34 by way of isolating diodes 100 to the supplemental switching contact. These diodes prevent feedback between the output conductors. Thus by inspection of the drawing, it is seen that each of the switching points 23*a*, 23*b*, 22*a* is identified by pulses sequentially extended through diodes 101, 102, and 103** thereby giving the arbitrary numerical identification "551". In a similar manner, the circuit B is identified by the numerical designation "333"; the circuit C is identified by the numerical designation "183"; and the circuit N is identified by the numerical designation "178".

With the foregoing description of the components in mind, it is thought that the remaining features of the invention will be best understood by the following description of the manner in which the circuit operates. For the purposes of this description, the operation will be described in connection with a telephone call extended from calling circuit A through a crosspoint switch to link #2, it being understood that the circuit operates in a similar manner when used in conjunction with other equipment and other switching matrices, and without regard as to whether the matrices are electronic or electromechanical devices.

Before a call is placed, any suitable equipment, such as an allotter, for example, allots link #2 to serve the next call that is received. Also, any suitable homing equipment drives hundreds, tens, and units registers 104—106 to a home position where a ZERO OPEN switch 107 opens contacts to stop the counting action. The allotter, registers and zero open switches are well known devices which are frequently used in automatic telephony. For example, the registers could be either stepping switches or ring counters and the zero open switches may be marked home positions or off-normal contacts. When the registers are reset a contact 108 is closed in the link to reset and inhibit a flip-flip circuit 109 thus terminating a flow of current through amplifier 110 to the ZERO OPEN switch. The circuit is now in condition to receive a call.

It is assumed that a subscriber at calling circuit A removes a receiver or handset to complete a connection to the crosspoint switch. Responsive thereto, any suitable equipment operates the magnets 27, 28 to close switching point **22*a*. The identifying circuit is cyclically generating the pulse trains indicated by the voltage curves shown adjacent output conductors 1–9. These pulses are transmitted through diodes 100, jumper 112, supplemental switching device 26*d*, and amplifier 113 to the center input of each of the AND gates 116–118 via conductor 119, all without immediate effect. Amplifier 113 also applies a voltage of the input of flip-flop 114 which is, however, adapted to turn "on" only when energized by the large voltage start pulse 95. After flip-flip 114 turns "on", flip-flip 115 also turns "on" to energize the right-hand input of each of the AND gates 116–118 via conductor 120. The time required for flip-flip 115 to energize conductor 120 is such that the large voltage pulse has already terminated, thus de-energizing the center input of the AND gates. As will become more apparent, the potential applied via conductor 120 is a start and a stop signal for the registers 104—106**.

Means are provided for registering the number of units pulses transmitted through the supplemental switching point **26*d* to the register 106. Specifically, the first small voltage pulse that is received after the start pulse causes a relatively small voltage pulse to appear on each of the output conductors 1–9. This small voltage pulse is applied through the diode 101 to the center input of each of the AND gates 116–18. During this and each of the next eight small voltage pulses, the output conductor 9 in the units allocator circuit 32 is energized and a signal is transmitted over conductor 122 to the left-hand input terminal of AND gate 118. At this time, the conductors 123, 124 are not energized; therefore, the AND gates 116, 117 cannot conduct. The AND gate 118 conducts and energizes an OR gate 130 to store the units digit 1 in the units register 106**.

The second pulse after the start pulse appears on conductor 122 and energizes the left-hand terminal of AND gate 118. However, nothing is stored in register 106 since the supplemental switching point **26*d* is connected to the 1 output conductor of the units allocator circuit 32 and the 1 conductor is pulsed only once after the start pulse. Thus, the AND gate 118** does not conduct.

After the ninth small voltage pulse the left-hand input of AND gate 118 is no longer energized, and on the tenth small voltage pulse the left-hand input of AND gate 117 is energized via conductor 123.

To count and store the pulses in the tens pulse train, a series of five pulses are transmitted through diode 102, jumper 112, supplemental switching point **26*d*, amplifier 113, and conductor 119 to the middle input of AND gate 117 while voltages on the 9 output conductor of the tens allocator 33 energizes conductor 123 and, therefore, the left-hand input of AND gate 117. Each tens pulse is stored in the tens register 105. After six pulses, no marking potential is applied through the diode 102 to the middle input of AND gate 117, and no further digit pulses are stored in the tens register 105. After the ninth pulse, the conductor 123 is no longer pulsed thereby removing the marking from the left-hand input of AND gate 117**.

The hundreds digit is registered in a manner similar to that described above in connection with the units and tens registration. Since the start of the binary count cycle, there have been a total of 28 pulses from source 30, i.e. the large voltage start pulse and nine small voltage pulses extended through each of the circuits 32—34. During each pulse remaining in the binary count cycle before reoccurrence of the large voltage start pulse, a stop pulse or voltage is transmitted through amplifier 125 to the reset terminal of flip-flip, thus returning it to its normal condition and de-energizing conductor 120. Thereafter, nothing further can be stored in the registers 104—106.

Means provided for terminating the storage of the digital information transmitted through the supplemental switching point after a full complement of units, tens, and hundreds pulses have been received. More specifically, the flip-flip 114 was triggered to start the original pulse count and has not yet been reset. Therefore, the reoccurrence of another large voltage start pulse can have no additional effect within the flip-flip 114. No output pulse is generated, and the flip-flip 115 does not again switch "on," but remains "off" for the duration of the call. Hence, an entire complement of pulses are counted during a single binary count cycle and a numerical value is stored in the registers 104—106 in accordance with the strapping between the supplemental switching point and the pulse train allocators 32—34, after which no additional pulses can be effective at the registers 104—106.

The circuit remains in the described condition for the duration of the call after which, the calling subscriber at circuit A replaces the receiver or handset to open a circuit extending to the link #2. Responsive thereto, the switching point 22a releases in any well known manner. Also, the link opens contact 108 in any known manner, thus removing the inhibiting potential applied to the reset terminal of flip-flip 109. The next pulse from the pulse source 30 triggers the flip-flip 109 and subsequent pulses are applied through the ZERO OPEN switch 107 to drive the registers 104—106 to a home position. When the registers reach their home positions, the ZERO OPEN switch opens the drive circuit. Also, the output of the flip-flip 109 energizes the reset terminal of flip-flip 114 via conductor 131. The flip-flip 114 resets and the circuit is ready for the next call.

To register the digit zero in a units position, advantage is taken of a special zero wire 98. More specifically, if the strapping from jumper 112 is switched from diode 101 to the zero conductor 98, the count cycle begins when the large voltage start pulse occurs on conductor 98. However, none of the small voltage pulses are transmitted through the supplemental switching point 26d to the register 106 which remains in the zero position to which it was driven while the ZERO OPEN switch 107 was closed.

Tens and hundreds zero registration results when the strapping between the allocator circuits 33, 34 and the supplemental switching point 26d is omitted.

An advantage of this arrangement is that any circuits extended through a crosspoint switch may be identified without requiring expensive components such as bandpass filters, tone generators, or the like, and without regard as to whether the crosspoint switch is electronic, magnetic or electromechanical. In addition, the identification circuit is compatible with most existing crosspoint switches and does not require expensive modification thereto. Moreover, the cross wiring arrangement through diodes 100 allows an arbitrary assignment or reassignment of the numerical designation of each of the circuits to be identified, thus providing an extremely flexible system. Hence, the circuit identification is accomplished positively and with a minimum of expensive equipment.

It is to be understood that the foregoing description of a specific embodiment of the invention is not to be construed as a limitation upon its scope.

We claim:

1. An electrical identifying circuit comprising a crosspoint switch including a plurality of switching means located at switching points in said switch, each of said switching means comprising principal switching means and supplemental switching means, said principal and supplemental switching means being operated and released in unison, means for coupling circuits to be identified to one side of said principal switching means, means including links for performing principal electrical functions cooperatively with said coupled circuits connected to the other side of said principal switching means, means for generating cyclically recurring pulse trains, each pulse train individually indicating a corresponding numerical value, means for individually connecting said pulse train generating means to one side of each of said supplemental switching means for selectively transmitting particular pulse trains through said supplemental switching means, and means for registering the numerical value of said transmitted pulse trains connected to the other side of said supplemental switching means.

2. The identifying circuit of claim 1 wherein said pulse train generating means comprises a source of cyclically recurring pulses, a minimum diode matrix, and at least one pulse train allocator, and means responsive to said pulse source for inhibiting said minimum diode matrix during at least a portion of each cycle in the output of said pulse source, the duration of said portion of said cycle being selected to provide the make-break ratio required by said registers.

3. The identifying circuit of claim 2 wherein said identifying means comprises a plurality of AND gates, means including a register connected to the output of each of said AND gates for recording the numerical value of pulses transmitted through said supplemental switching means, means for marking one input on each of said AND gates via individual ones of said supplemental switching means, means for marking an input on each of said AND gates responsive to the start of a first pulse train, and means responsive to each pulse of a pulse train for selectively energizing an input terminal of an individually associated one of said AND gates.

4. An identifying circuit for use in a telephone switching system comprising a plurality of calling circuits, a plurality of link circuits, a crosspoint switch, means for selectively interconnecting said calling circuits and said link circuits through a plurality of switching means in said matrix, each of said switching means comprising at least three switching points connected to tip, ring, and at least one sleeve conductor, means for generating cyclically recurring pulse trains, each pulse train indicating a corresponding numerical value, means for individually connecting said pulse train generating means to said sleeve conductor on one side of each of said switching means for transmitting particular pulse trains through said switching means, and means connected to said sleeve conductor on the other side of said switching means for registering the pulses in said particular pulse trains and for giving an indication of the calling circuit responsive to the pulses that are registered.

5. The identifying circuit of claim 4 wherein said pulse train generating means comprises a source of cyclically recurring pulses, a minimum diode matrix, and means for allocating pulses transmitted from said source through said matrix to particular output conductors, and means responsive to the output of the pulse source for inhibiting said transmission of pulses through said matrix for a fixed period during each recurring pulse period thereby providing a fixed break period between pulses appearing on said output conductors.

6. The identifying circuit of claim 5 and means responsive to the completion of a full complement of said pulse trains for extending a stop pluse, means responsive to said stop pulse for terminating the registration of the pulses transmitted through said switching means, and means for thereafter preventing registration of additional pulses which may be transmitted through said switching means.

7. A counting device including a pulse generator coupled through a minimum diode matrix to drive a plurality of pulse train allocator circuits, a number of output conductors connected to said allocator circuits, said pulse train allocator including diodes interconnecting said output conductors so that all pulses applied to a first of said conductors also appear on all of the succeeding output conductors, and pulses applied to a second output conductor appear on all of the succeeding output conductors but do not appear on said first output conductor, there being similar connections through said pulse train allocator to all subsequent ones of said output conductors, whereby each output conductor is pulsed a number of times which indicates the position of such output conductor among the output conductors of said pulse train allocator.

8. The counting device of claim 7 and means for amplifying only a first pulse transmitted through said matrix to said pulse train allocator, thereby providing a relatively large voltage start pulse to indicate the start of a count cycle, and means for applying said start pulse to all of said output conductors of at least one of said pulse allocator circuits before the first of said output conductors is pulsed.

9. An identifying circuit comprising a crosspoint switch having a plurality of switching means, each of said switching means comprising principal switching means and supplemental switching means operated and released in unison, means for coupling the circuits to be identified to one side of said principal switching means and links for performing principal electrical functions to the other side of said principal switching means, a plurality of pulse train allocators each having a number of output conductors, a plurality of registers, each of said allocators being individually associated with a register, means including a series of diodes in each of said allocators for interconnecting said output conductors so that pulses applied to a first of said output conductors also appear on all succeeding output conductors, and pulses applied to a second output conductor appear on all succeeding output conductors but do not appear on said first output conductors, there being similar connections through said diodes to all subsequent ones of said output conductors, means for individually connecting said output conductors to one side of each of said supplemental switching means for transmitting a discrete number of recurring pulses through said supplemental switching means, and means for connecting said register means to the other side of said supplemental switching means.

10. The identification circuit of claim 9 and amplifier means for amplifying only a first pulse received at one of said pulse train allocators, thereby providing a relatively large voltage start pulse to indicate the start of a count cycle, and means including said series of diodes for applying said large voltage start pulse to all of said output conductors of said one allocator before the first of said output conductors is pulsed.

11. The identification circuit of claim 10 and a plurality of AND gates, each of said registers being coupled to the output of an individually associated one of said AND gates for recording the numerical value of pulses transmitted through said supplemental switching means, means for marking one input on each of said AND gates via individual ones of said supplemental switching means and the output conductor connected thereto, means for marking another input terminal of each of said AND gates responsive to said large voltage start pulse, and means including the last output conductor of each of said pulse train allocators for selectively energizing a third input of an individual AND gate responsive to each pulse transmitted through an associated allocator.

No references cited.